(12) United States Patent
Chen et al.

(10) Patent No.: US 11,806,651 B2
(45) Date of Patent: Nov. 7, 2023

(54) GAS FILTERING RUBBER PIPE AND PRESSURE REGULATING VALVE BANK

(71) Applicant: Chant Heat Energy Science & Technology (Zhongshan) Co., LTD., Zhongshan (CN)

(72) Inventors: Guoquan Chen, Zhongshan (CN); Xianmin Deng, Zhongshan (CN); Jintang You, Zhongshan (CN); Guangzhi Mai, Zhongshan (CN)

(73) Assignee: Chant Heat Energy Science & Technology (Zhongshan) Co., LTD.

( * ) Notice: Subject to any disclaimer, the term of this patent is extended or adjusted under 35 U.S.C. 154(b) by 93 days.

(21) Appl. No.: 17/613,573

(22) PCT Filed: May 17, 2021

(86) PCT No.: PCT/CN2021/094128
§ 371 (c)(1),
(2) Date: Nov. 23, 2021

(87) PCT Pub. No.: WO2021/233252
PCT Pub. Date: Nov. 25, 2021

(65) Prior Publication Data
US 2022/0266182 A1 Aug. 25, 2022

(30) Foreign Application Priority Data
May 18, 2020 (CN) .......................... 202020835260.1

(51) Int. Cl.
*G05D 16/04* (2006.01)
*B01D 45/02* (2006.01)
(Continued)

(52) U.S. Cl.
CPC .............. *B01D 45/08* (2013.01); *F17C 13/04* (2013.01); *G05D 16/04* (2013.01);
(Continued)

(58) Field of Classification Search
CPC ......... G05D 16/04; B01D 45/02; B01D 45/08
See application file for complete search history.

(56) References Cited

U.S. PATENT DOCUMENTS

| | | | | |
|---|---|---|---|---|
| 4,271,992 A * | 6/1981 | Becker | ................ | B67D 1/1466 138/40 |
| 5,176,175 A * | 1/1993 | Farnham | ................ | F23D 14/38 251/225 |
| 5,711,508 A * | 1/1998 | Schreiber | ................ | F16L 37/28 251/149.6 |

FOREIGN PATENT DOCUMENTS

| | | |
|---|---|---|
| CN | 20335551 | 12/2013 |
| CN | 203892652 | 10/2014 |

(Continued)

OTHER PUBLICATIONS

CN203355511U; Mai Zhenghui, Chen Guoquan, Gu Youzhi, You Jintang; Dec. 25, 2013.*
(Continued)

*Primary Examiner* — Paul J Gray (57) ABSTRACT

A gas filtering rubber pipe and a pressure regulating valve bank are disclosed. The pressure regulating valve bank includes an angle valve, a pressure reducing valve and the gas filtering rubber pipe including a pipe body and a filtering mechanism. The filtering mechanism includes a shell assembly and a connector arranged at a lower end of the shell assembly, the shell assembly is provided with a separation cavity and a gas outlet channel located in an upper portion of the shell assembly. The gas outlet channel can be communicated with the separation cavity. A lower end of the connector is provided with a connecting portion fixedly connected with an upper end of the pipe body, an upper end of the connector is provided with a filtering barrier. A gas outlet hole is arranged in a peripheral wall of the connector connected with the filtering barrier.

18 Claims, 8 Drawing Sheets

(51) Int. Cl.
*B01D 45/08* (2006.01)
*F17C 13/04* (2006.01)
(52) U.S. Cl.
CPC ................. *F17C 2205/0332* (2013.01); *F17C 2205/0341* (2013.01); *F17C 2205/0382* (2013.01)

(56) References Cited

FOREIGN PATENT DOCUMENTS

| | | |
|---|---|---|
| CN | 106039847 | 10/2016 |
| CN | 205760158 | 12/2016 |
| CN | 2017126270 | 3/2018 |
| CN | 212360794 | 1/2021 |
| GB | 759400 | 10/1956 |

OTHER PUBLICATIONS

English Translation of International Search Report Application No. PCT/CN2021/094128 dated Jul. 14, 2021.
International Search Report Application No. PCT/CN2021/094128 dated Jul. 14, 2021.
English Translation of Written Opinion of International Search Report Application No. PCT/CN2021/094128 dated Jul. 23, 2021.
Written Opinion of International Search Report Application No. PCT/CN2021/094128 dated Jul. 23, 2021.

* cited by examiner

GAS FILTERING RUBBER PIPE AND PRESSURE REGULATING VALVE BANK

PRIORITY

This application is a national stage filing, under 35 U.S.C. § 371, of International Application Number PCT/CN2021/094128, filed May 17, 2021, claiming priority thereto, which claims priority to Chinese Patent Application Number 2020208352601, filed May 18, 2020. This application claims priority under 35 U.S.C. § 119 to Chinese Patent Application Number 2020208352601, filed May 18, 2020. The entire content of International Application Number PCT/CN2021/094128, filed May 17, 2021, is incorporated by reference. The entire content of Chinese Patent Application Number 2020208352601, filed May 18, 2020, is incorporated by reference.

TECHNICAL FIELD

The disclosure relates to the field of gas appliances, and more particularly, to a gas filtering rubber pipe and a pressure regulating valve bank.

BACKGROUND

The gas supply of an existing gas bottle is usually switched on or off through an angle valve which is connected with a pressure reducing valve at a gas outlet thereof. Pressure of output gas is reduced and stabilized through the pressure reducing valve, which facilitates better gas supply to a gas device. Since there are some impurities such as water and oil in the gas bottle, and the gas when outputted from an on-off valve has a high pressure, the mixed impurities such as water and oil are easy to enter other valve bodies or gas devices together with the gas, and the impurities may corrode an inner wall channel of the valve body, which affects gas tightness of the valve body. In addition, when a gas stove is used, the gas mixed with impurities may also cause insufficient combustion, which affects the use of the gas device such as gas stove.

SUMMARY

The disclosure aims to solve at least one of the technical problems in the prior art. For this purpose, the disclosure provides a gas filtering rubber pipe, which is capable of filtering gas transported through the gas filtering rubber pipe.

The disclosure further provides a pressure regulating valve bank with the gas filtering rubber pipe.

The gas filtering rubber pipe according to an embodiment in a first aspect of the disclosure includes a pipe body and a filtering mechanism, the filtering mechanism includes a shell assembly and a connector arranged at a lower end of the shell assembly. The shell assembly is provided with a separation cavity and a gas outlet channel located in an upper portion of the shell assembly, the gas outlet channel is capable of being communicated with the separation cavity, a lower end of the connector is provided with a connecting portion configured for being fixedly connected with an upper end of the pipe body, an upper end of the connector is provided with a filtering barrier, and a gas outlet hole is arranged in a peripheral wall of the connector connected with the filtering barrier.

The gas filtering rubber pipe according to the embodiment of the disclosure at least has the following beneficial effects.

When in use, gas enters from a lower end of the pipe body and is transported in the pipe body, when the gas with a high transportation pressure enters the connector, the filtering barrier blocks continuous upward transportation of the gas, which reduces the transportation pressure and transversely outputs the gas from the gas outlet hole, the filtering barrier blocks the upward transportation of the gas in the separation cavity and enables the gas to be transversely transported for a preset distance. When the gas is transversely transported, some impurities such as water and oil subside from the gas due to the gravity, so that the impurities are filtered and separated, and then the gas bypasses the filtering barrier to be continuously transported upwardly and is outputted through the gas outlet channel. The disclosure is simple in structure, can achieve a good gas filtering effect, and can be well applied to a gas system.

According to some embodiments of the disclosure, a movable plug assembly is provided in the gas outlet channel, and the movable plug assembly enables the gas outlet channel to be communicated with or disconnected from the separation cavity. By arranging the movable plug assembly, the gas outlet channel can be controlled to be opened and closed conveniently, the transportation of the gas in a pipeline system can be controlled conveniently, and use safety of the disclosure can be improved.

According to some embodiments of the disclosure, the movable plug assembly includes a fixed plug body and a movable ejector pin, the fixed plug body is arranged in the gas outlet channel and provided with a plug body channel capable of communicating the gas outlet channel with the separation cavity, the movable ejector pin penetrates through the plug body channel and has a gap with a peripheral wall of the plug body channel, a lower end of the movable ejector pin is provided with a shielding portion capable of closing a gas inlet end of the plug body channel, and the movable ejector pin is capable of moving up and down. By moving the movable ejector pin up and down, the plug body channel can be shielded and closed by the shielding portion or the separation cavity can be communicated with the plug body channel, thus controlling opening and closing of the gas outlet channel. The movable plug assembly is simple in structure and convenient to manufacture, and can easily control opening and closing of the gas outlet channel.

According to some embodiments of the disclosure, the movable ejector pin is sleeved with an elastic member, an upper end of the fixed plug body is provided with a clamping portion, the movable ejector pin is provided with a clamping boss capable of abutting against the clamping portion, the clamping boss is located between the elastic member and the clamping portion, and two ends of the elastic member respectively abut against a lower end of the fixed plug body and the clamping boss. By arranging the elastic member, the movable ejector pin makes the shielding portion abut against the gas inlet end of the plug body channel under an action of the elastic member, so as to shield and close the plug body channel and close the gas outlet channel. When other valve body or gas device is connected with the filtering mechanism, other valve body or gas device is capable of pushing the movable ejector pin and compressing the elastic member to make the shielding portion move downwardly, thus communicating the separation cavity with the plug body channel, and opening the gas outlet channel. The elastic member is simple in structure and convenient to manufacture and mount, and can realize a self-closing function of the movable plug assembly, with a high reliability.

According to some embodiments, a first sealing ring is arranged between an outer peripheral wall of the fixed plug body and an inner peripheral wall of the gas outlet channel. By arranging the first sealing ring between the outer peripheral wall of the fixed plug body and the inner peripheral wall of the gas outlet channel, a gap between the outer peripheral wall of the fixed plug body and the inner peripheral wall of the gas outlet channel can be sealed, so that sealing performance is improved, thus avoiding gas leakage and improving use safety.

According to some embodiments of the disclosure, a lower end of the shell assembly is provided with an annular stepped portion and a connector channel located in the annular stepped portion, the connector penetrates through the annular stepped portion via the connector channel, the upper end of the connector is provided with a first abutting portion abutting against an upper end of the annular stepped portion, the pipe body is provided with a locking sleeve, and the upper end of the pipe body is fixedly connected with the connecting portion through the locking sleeve. By arranging the annular stepped portion and the first abutting portion, and fixedly connecting the upper end of the pipe body with the connecting portion through the locking sleeve, the connector can be mounted and fixed conveniently, and stability of connection between the connector and each of the shell assembly and the pipe body can be improved.

According to some embodiments of the disclosure, a second sealing ring is arranged between an outer peripheral wall of the connector and an inner peripheral wall of the connector channel. By arranging the second sealing ring between the outer peripheral wall of the connector and the inner peripheral wall of the connector channel, a gap between the outer peripheral wall of the connector and the inner peripheral wall of the connector channel can be sealed, so that sealing performance is improved, thus avoiding gas leakage and improving use safety.

According to some embodiments of the disclosure, a lower end of the pipe body is provided with a connecting assembly configured for being connected with an external valve body. By arranging the connecting assembly, the disclosure can be connected with other valve bodies conveniently, the disclosure can be mounted and used conveniently, and use convenience can be improved.

According to some embodiments of the disclosure, the connecting assembly includes a connecting handwheel and a gas inlet connector, the gas inlet connector is fixedly connected with the lower end of the pipe body, the connecting handwheel is movably sleeved on the gas inlet connector, a lower end of the gas inlet connector is provided with a second abutting portion capable of abutting against a lower end of the connecting handwheel, and the connecting handwheel is capable of being connected with the external valve body. By arranging the connecting handwheel and the gas inlet connector, the connecting handwheel is capable of being connected with the valve body, and the gas inlet connector is pressed on a connecting end of the valve body through the second abutting portion, so that the disclosure can be connected with other valve bodies for use. The connecting handwheel and the gas inlet connector are simple in structure and convenient to connect and use.

The pressure regulating valve bank according to an embodiment in a second aspect of the disclosure includes an angle valve, a pressure reducing valve and the gas filtering rubber pipe according to the embodiment in the first aspect of the disclosure above. A gas outlet end of the angle valve is connected with a gas inlet end of the gas filtering rubber pipe, and a gas inlet end of the pressure reducing valve is connected with a gas outlet end of the gas filtering rubber pipe.

The pressure regulating valve bank according to the embodiment of the disclosure at least has the following beneficial effects: by using the gas filtering rubber pipe above, the gas is capable of being filtered when being outputted to the pressure reducing valve from the gas filtering rubber pipe, so that durability and use safety of the pressure regulating valve bank can be improved, and a gas device matched with the pressure regulating valve bank can have a better combustion effect.

BRIEF DESCRIPTION OF THE DRAWINGS

The above and/or additional aspects and advantages of the disclosure will be apparent and easily understood from the descriptions of the embodiments with reference to the following accompanying drawings, wherein.

REFERENCE NUMERALS

100 refers to pipe body, and 110 refers to locking sleeve;
200 refers to filtering mechanism, 210 refers to shell assembly, 211 refers to separation cavity, 212 refers to gas outlet channel, 213 refers to annular stepped portion, 214 refers to connector channel, 220 refers to connector, 221 refers to filtering barrier, 222 refers to gas outlet hole, 223 refers to first abutting portion, 224 refers to second sealing ring, 225 refers to connecting portion, 230 refers to movable plug assembly, 231 refers to fixed plug body, 232 refers to movable ejector pin, 233 refers to plug body channel, 234 refers to shielding portion, 235 refers to elastic member, 236 refers to clamping portion, 237 refers to clamping boss, and 238 refers to first sealing ring;
300 refers to connecting assembly, 310 refers to connecting handwheel, 320 refers to gas inlet connector, and 321 refers to second abutting portion; and 400 refers to angle valve, and 500 refers to pressure reducing valve.

DETAILED DESCRIPTION

Embodiments of the present disclosure will be described in detail below. Examples of the embodiments are illustrated in the accompanying drawings, where the same or like reference numerals throughout the figures indicate the same or like elements having the same or like functions. The embodiments described below with reference to the accompanying drawings are exemplary and are intended only to explain the present disclosure instead of being construed as limiting the present disclosure.

In the description of the present disclosure, it should be understood that, descriptions relating to orientation, for example, orientation or positional relationships indicated by "up", "down" etc. are based on the orientation or positional relationships shown in the accompanying drawings, and are to facilitate the description of the present disclosure and simplify the description only, rather than indicating or implying that the device or element referred to must have a specific orientation or be constructed and operated in a specific orientation, and therefore cannot be construed as limiting the present disclosure.

If "first" and "second", etc. are referred to, it is only for the purpose of distinguishing technical features, and shall not be understood as indicating or implying relative importance or implying the number of the indicated technical features or implying the sequence of the indicated technical features.

In the description of the present disclosure, unless otherwise explicitly defined, the words such as "set", "install", and "connect" should be understood in a broad sense, and those of ordinary skills in the art can determine the specific meanings of the above words in the present disclosure in a rational way in combination with the specific contents of the technical solutions.

Figure 1:
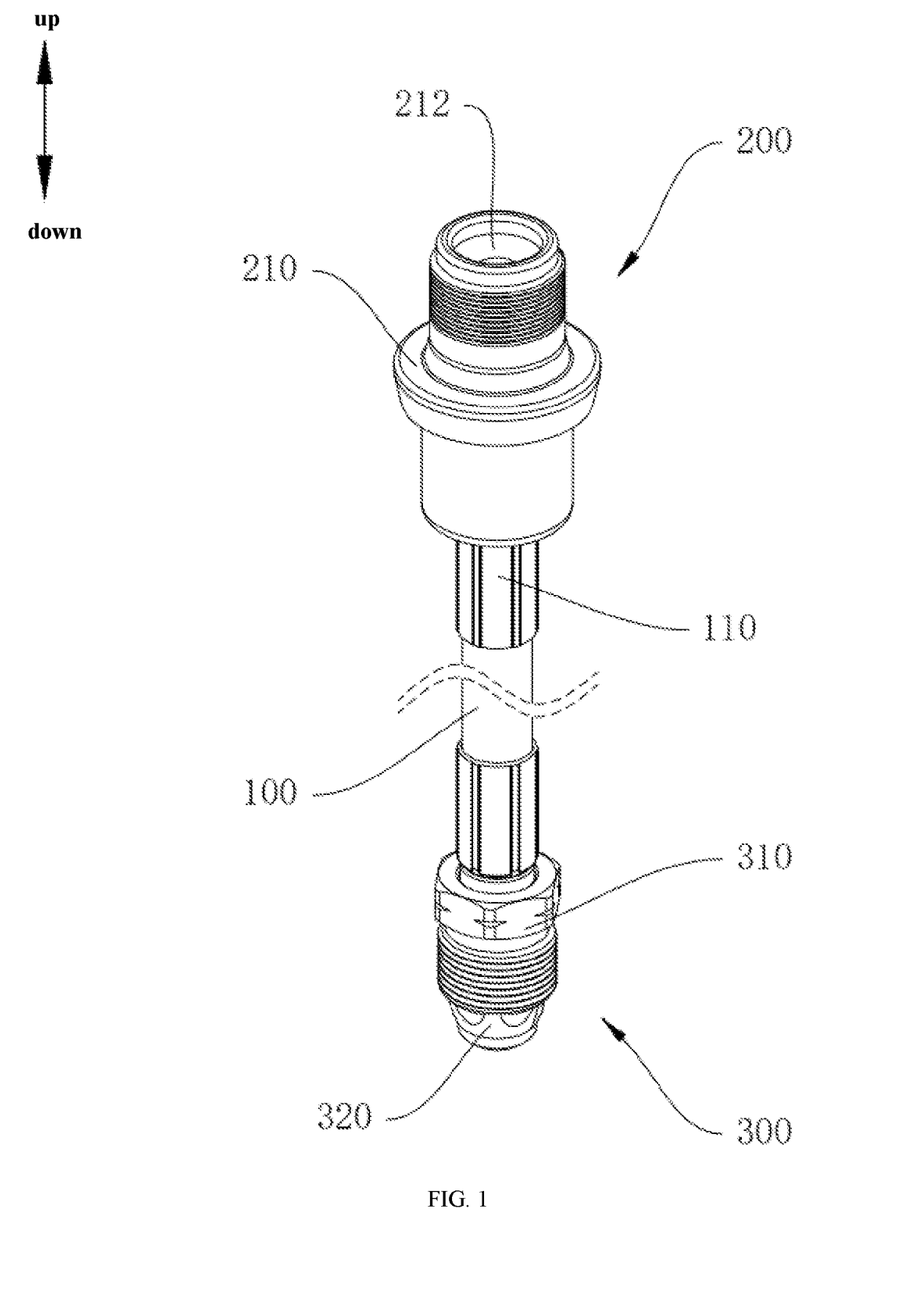
FIG. 1 is a schematic structural diagram of a gas filtering rubber pipe according to an embodiment of the disclosure.
Figure 2:
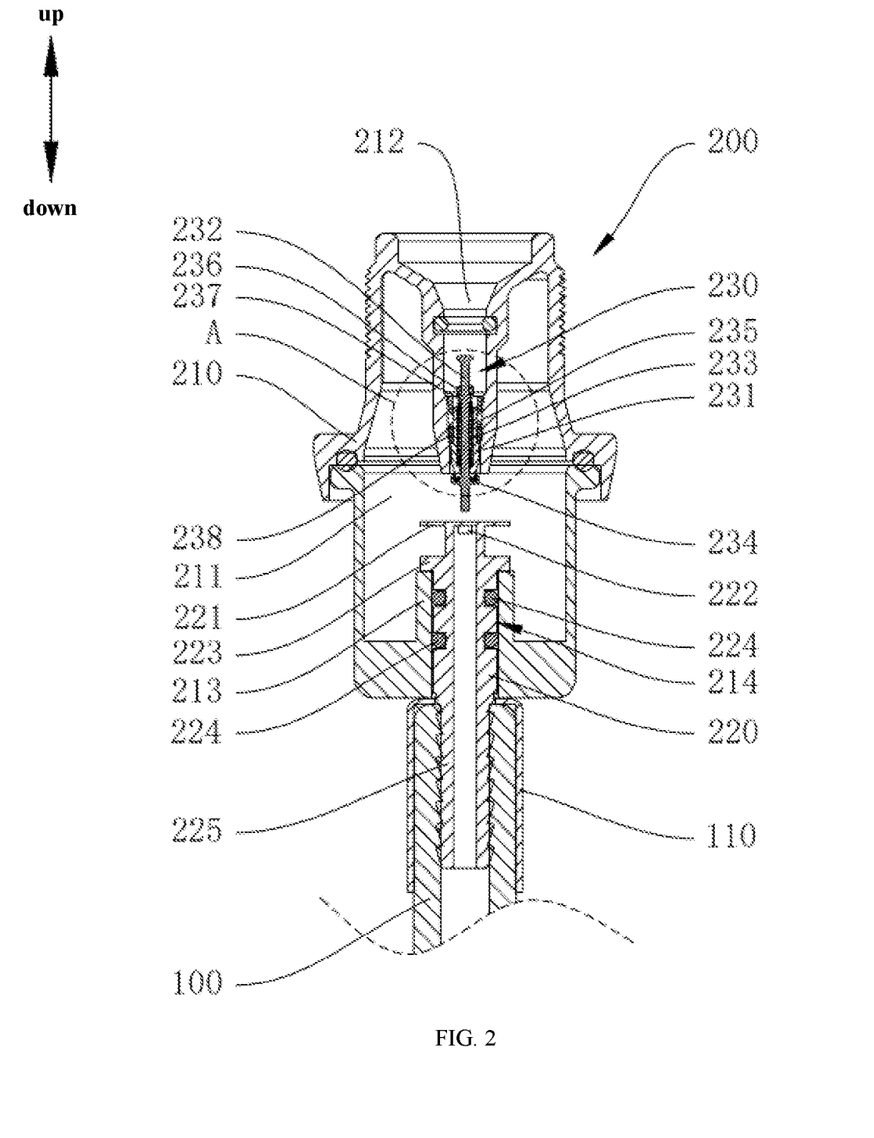
FIG. 2 is a schematic structural diagram of a partial cross-section of the gas filtering rubber pipe in FIG. 1.

With reference to FIG. 1 and FIG. 2, a gas filtering rubber pipe includes a pipe body 100 and a filtering mechanism 200. The filtering mechanism 200 includes a shell assembly 210 and a connector 220 arranged at a lower end of the shell assembly 210. The shell assembly 210 is provided with a separation cavity 211 and a gas outlet channel 212 located in an upper portion of the shell assembly 210, the gas outlet channel 212 is capable of being communicated with the separation cavity 211, a lower end of the connector 220 is provided with a connecting portion 225 configured for being fixedly connected with an upper end of the pipe body 100, an upper end of the connector 220 is provided with a filtering barrier 221, and a gas outlet hole 222 is arranged in a peripheral wall of the connector 220 connected with the filtering barrier 221.

When in use, gas enters from a lower end of the pipe body 100 and is transported in the pipe body 100. When the gas with a high transportation pressure enters the connector 220 along with impurities, the filtering barrier 221 blocks continuous upward transportation of the gas, which reduces the transportation pressure, so that the impurities such as water and oil are not easy to be transported upwardly along with the gas, and the gas is transversely outputted from the gas outlet hole 222. The filtering barrier 221 blocks the upward transportation of the gas in the separation cavity 211 and enables the gas to be transversely transported for a preset distance. When the gas is transversely transported, some impurities such as water and oil subside from the gas due to the gravity, so that the impurities are filtered and separated, and then the gas bypasses the filtering barrier 221 to be continuously transported upwardly and is outputted through the gas outlet channel 212. The disclosure is simple in structure, can achieve a good gas filtering effect, and can be well applied to a gas system.

Figure 6:
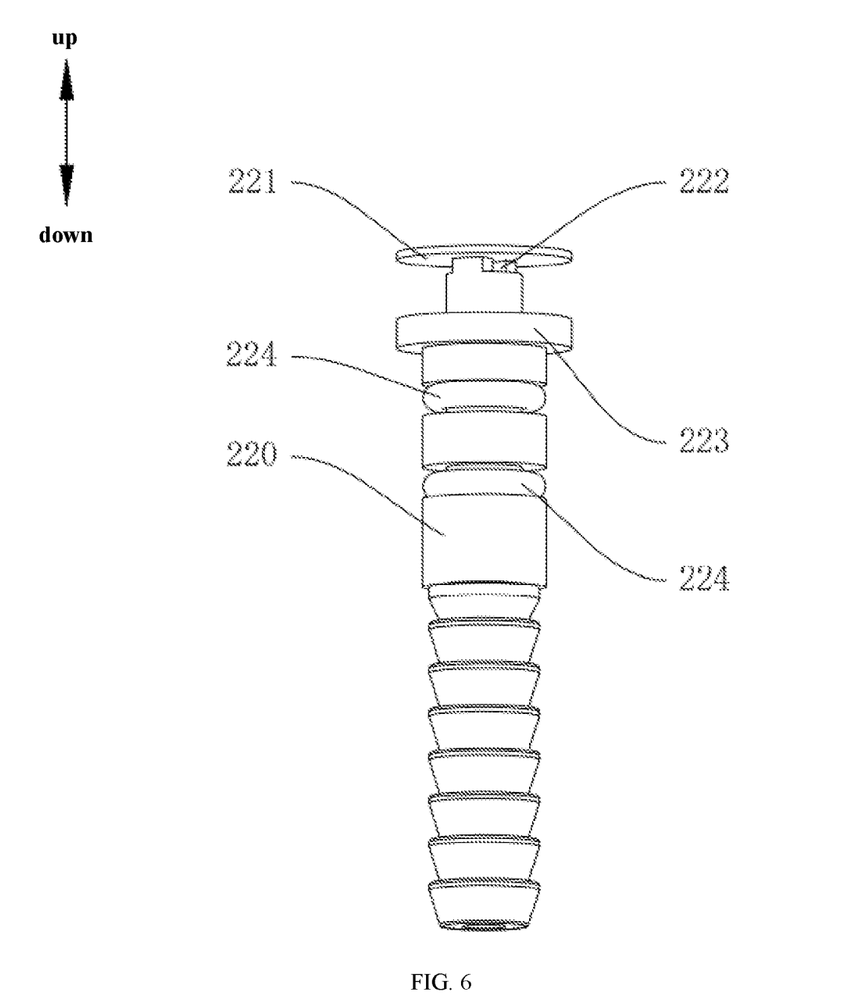
FIG. 6 is a schematic structural diagram of a connector in FIG. 1.

In the embodiment, as shown in FIG. 2 and FIG. 6, two gas outlet holes 222 are provided, and the gas is blocked by the filtering barrier 221 and then split to be outputted from the two gas outlet holes 222. The connecting portion 225 has a bamboo joint structure and is inserted into the upper end of the pipe body 100 to realize fixed connection. In actual application, three or more gas outlet holes 222 may be provided, which may be round holes or square holes, and may be set according to actual use needs specifically, and a specific size of the filtering barrier 221 may also be set according to actual use needs. The filtering barrier 221 may be made of a material with filtering and adsorption effects and may also be in an "n" shape or other curved surface structures. The connecting portion 225 and the pipe body 100 may also be connected by heat melting, welding, fixed bonding, etc., so as to realize non-detachable fixed connection between the connecting portion and the pipe body, which will not be limited herein.

In some embodiments, the gas outlet channel 212 is provided with a movable plug assembly 230, and the movable plug assembly 230 enables the gas outlet channel 212 to be communicated with or disconnected from the separation cavity 211. By arranging the movable plug assembly 230, the gas outlet channel 212 can be controlled to be opened and closed conveniently, the transportation of the gas in a pipeline system can be controlled conveniently, and use safety of the disclosure can be improved.

Figure 3:
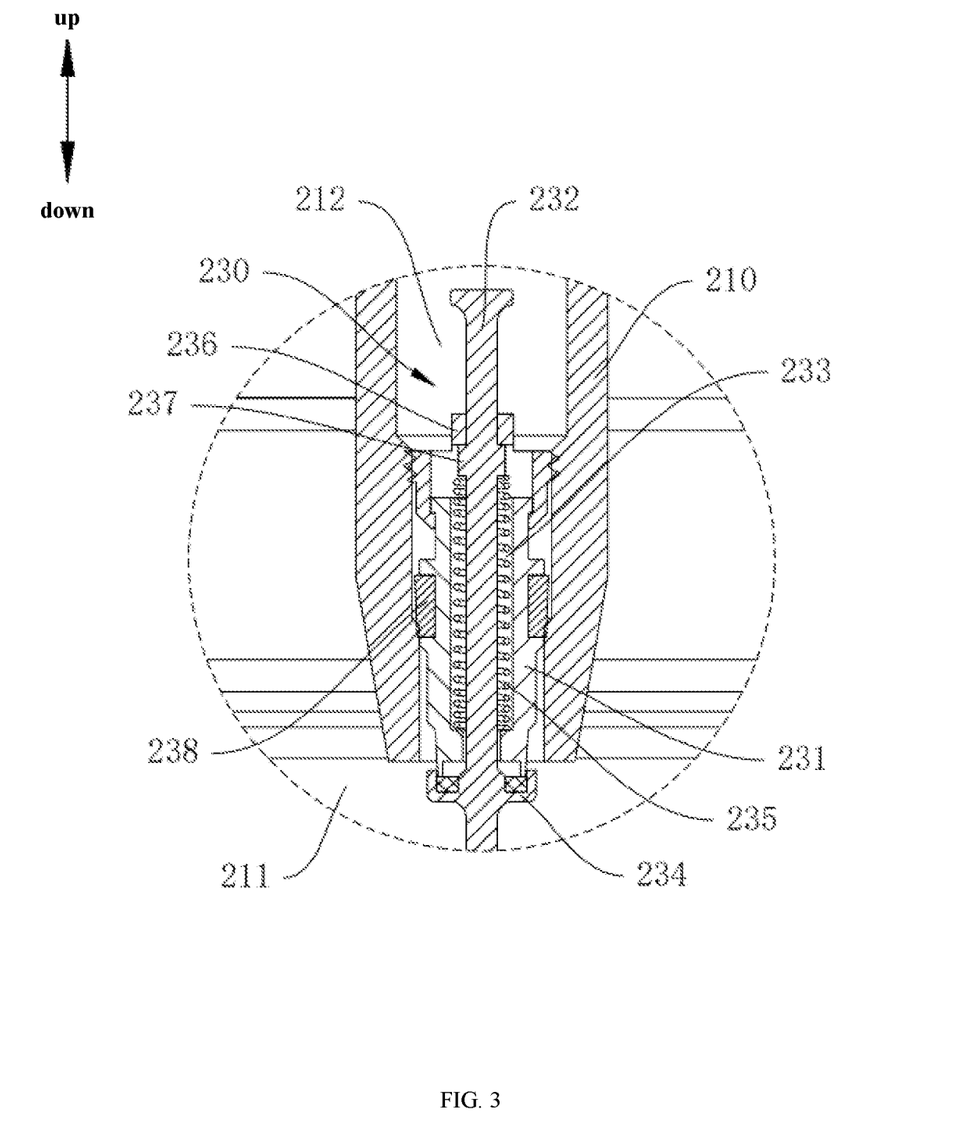
FIG. 3 is an enlarged schematic diagram of part A in FIG. 2.
Figure 4:
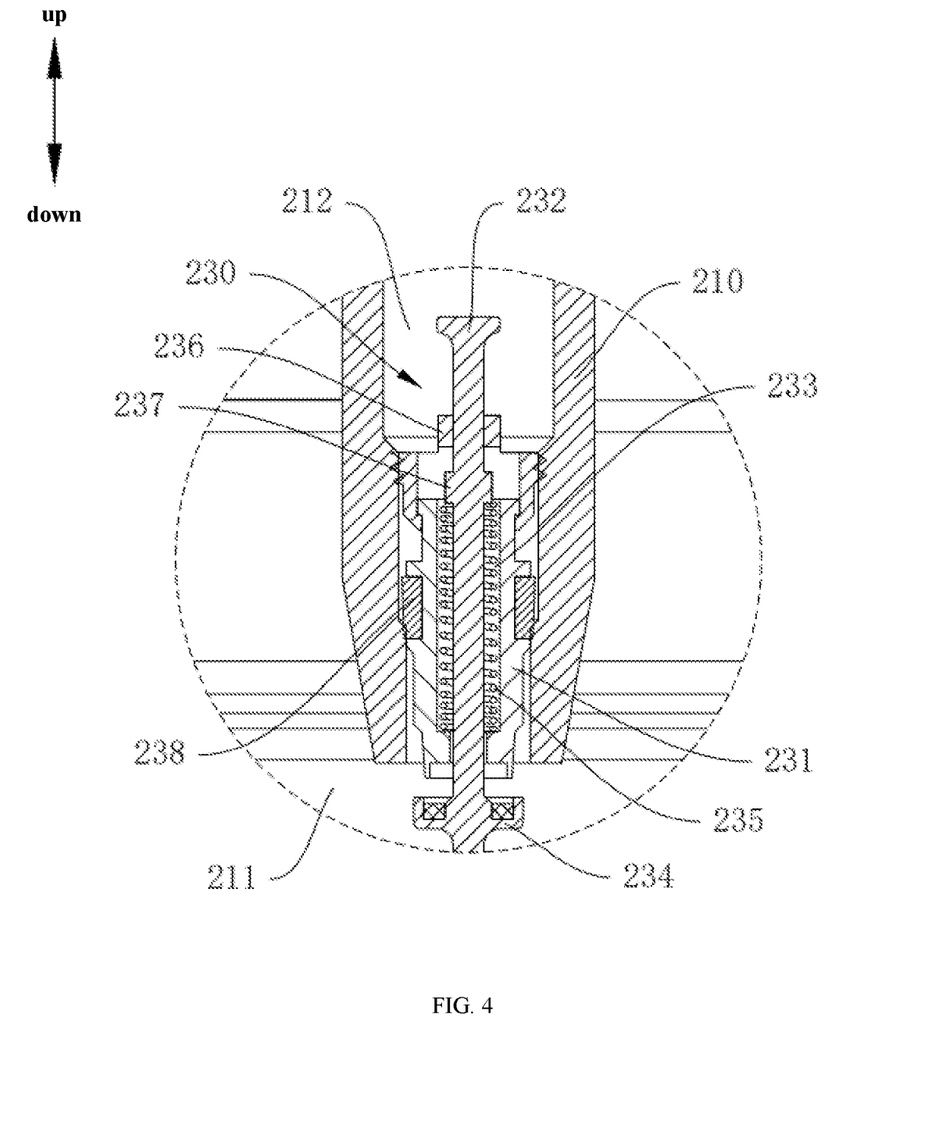
FIG. 4 is a schematic structural diagram of a cross-section of a movable plug assembly in an opened state.

In the embodiment, as shown in FIG. 2, FIG. 3 and FIG. 4, a gas inlet end of the gas outlet channel 212 is provided with the movable plug assembly 230, and the movable plug assembly 230 controls communication or disconnection of the gas inlet end of the gas outlet channel 212 with the separation cavity 211, thus controlling a use state of the filtering mechanism 200. In actual application, a specific structure of the movable assembly may be set according to actual use needs, which will not be described in detail herein, but will be described in detail below.

In some embodiments, the movable plug assembly 230 includes a fixed plug body 231 and a movable ejector pin 232. The fixed plug body 231 is arranged in the gas outlet channel 212 and provided with a plug body channel 233 capable of communicating the gas outlet channel 212 with the separation cavity 211, the movable ejector pin 232 penetrates through the plug body channel 233 and has a gap with a peripheral wall of the plug body channel 233, a lower end of the movable ejector pin 232 is provided with a shielding portion 234 capable of closing a gas inlet end of the plug body channel 233, and the movable ejector pin 232 is capable of moving up and down. By moving the movable ejector pin 232 up and down, the plug body channel 233 can be shielded and closed by the shielding portion 234 or the separation cavity 211 can be communicated with the plug body channel 233, thus controlling opening and closing of the gas outlet channel 212. The movable plug assembly is simple in structure and convenient to manufacture, and can easily control opening and closing of the gas outlet channel 212.

In the embodiment, as shown in FIG. 3, the shielding portion 234 abuts against a lower end of the fixed plug body 231, and the plug body channel 233 is closed and shielded to disconnect the gas outlet channel 212 from the separation cavity 211. As shown in FIG. 4, when the movable ejector pin 232 moves downwardly, the shielding portion 234 moves downwardly to keep away from the lower end of the fixed plug body 231, and the plug body channel 233 is communicated with the separation cavity 211, thus communicating the gas outlet channel 212 with the separation cavity 211. In actual application, the movable ejector pin 232 may be connected through a thread, a clamping structure, and the like, so that the movable ejector pin is movable, and a specific structure may be set according to actual use needs, which will not be described in detail here, but will be described in detail below.

In some embodiments, the movable ejector pin 232 is sleeved with an elastic member 235, an upper end of the fixed plug body 231 is provided with a clamping portion 236, the movable ejector pin 232 is provided with a clamping boss 237 capable of abutting against the clamping portion 236, the clamping boss 237 is located between the elastic member 235 and the clamping portion 236, and two ends of the elastic member 235 respectively abut against a lower end of the fixed plug body 231 and the clamping boss 237. By arranging the elastic member 235, the movable ejector pin 232 makes the shielding portion 234 abut against the gas inlet end of the plug body channel 233 under an action of the elastic member 235, so as to shield and close the plug body channel 233 and close the gas outlet channel 212. When other valve body or gas device is connected with the filtering mechanism 200, other valve body or gas device is capable of pushing the movable ejector pin 232 and compressing the elastic member 235 to make the shielding portion 234 move downwardly, thus communicating the separation cavity 211 with the plug body channel 233, and opening the gas outlet channel 212. The elastic member is simple in structure and convenient to manufacture and mount, and can realize a self-closing function of the movable plug assembly 230, with a high reliability.

Figure 5:
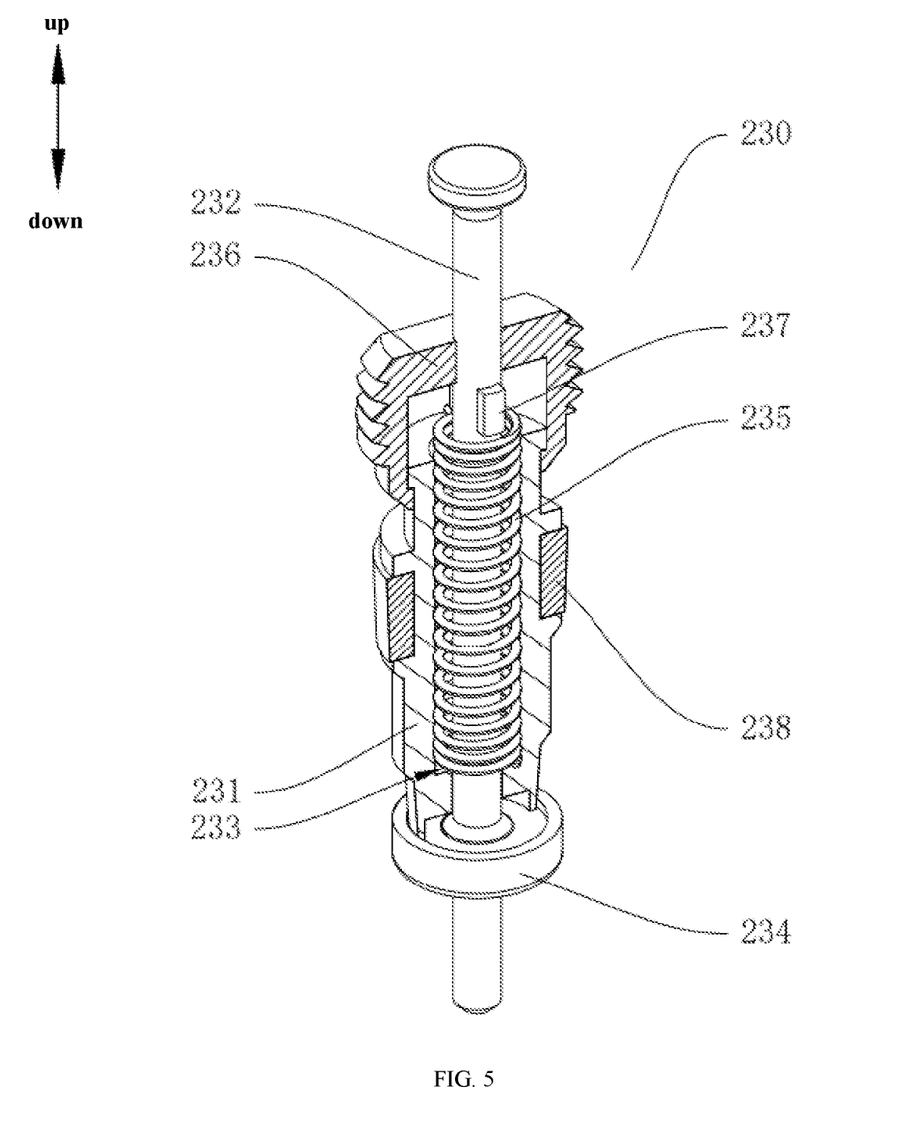
FIG. 5 is a schematic structural diagram of a partial cross-section of the movable plug assembly in FIG. 1.

In the embodiment, as shown in FIG. 3, FIG. 4 and FIG. 5, the elastic member 235 is a spring, and an upper end of the shell assembly 210 is provided with a thread configured for being connected with an external valve body. When the gas outlet channel 212 is in a closed state, the clamping boss 237 abuts against the clamping portion 236 under the action of the elastic member 235, so that the shielding portion 234 closes and shields the gas inlet end of the plug body channel 233. When the filtering mechanism 200 is connected with the external valve body, the external valve body pushes the movable ejector pin 232 to move downwardly, the clamping boss 237 moves downwardly and compresses the elastic member 235, and the shielding portion 234 keeps away from the lower end of the fixed plug body 231 to open the gas outlet channel 212. After the external valve body is removed, the movable ejector pin 232 moves upwardly to reset under the action of the elastic member 235, thus closing the gas outlet channel 212 automatically. In actual application, the upper end of the shell assembly 210 is provided with a clamping structure configured for being connected with the external valve body, and a specific structure of the movable plug assembly 230 may also be changed according to actual use needs, which will not limited herein.

In some embodiments, a first sealing ring 238 is arranged between an outer peripheral wall of the fixed plug body 231 and an inner peripheral wall of the gas outlet channel 212. By arranging the first sealing ring 238 between the outer peripheral wall of the fixed plug body 231 and the inner peripheral wall of the gas outlet channel 212, a gap between the outer peripheral wall of the fixed plug body and the inner peripheral wall of the gas outlet channel can be sealed, so that sealing performance is improved, thus avoiding gas leakage and improving use safety.

In the embodiment, as shown in FIG. 3, FIG. 4 and FIG. 5, the first sealing ring 238 is arranged on the outer peripheral wall of the fixed plug body 231. When the fixed plug body 231 is connected to the gas outlet channel 212, the outer peripheral wall of the fixed plug body 231 and the inner peripheral wall of the gas outlet channel 212 squeeze the first sealing ring 238, so as to seal the gap between the outer peripheral wall of the fixed plug body and the inner peripheral wall of the gas outlet channel. In actual application, the shape, structure and the like of the first sealing ring 238 may be set according to actual use needs, which will not be limited herein.

In some embodiments, a lower end of the shell assembly 210 is provided with an annular stepped portion 213 and a connector channel 214 located in the annular stepped portion 213, the connector 220 penetrates through the annular stepped portion 213 via the connector channel 214, the upper end of the connector 220 is provided with a first abutting portion 223 abutting against an upper end of the annular stepped portion 213, the pipe body 100 is provided with a locking sleeve 110, and the upper end of the pipe body 100 is fixedly connected with the connecting portion 225 through the locking sleeve 110. By arranging the annular stepped portion 213 and the first abutting portion 223, and fixedly connecting the upper end of the pipe body 100 with the connecting portion 225 through the locking sleeve 110, the connector 220 can be mounted and fixed conveniently, and stability of connection between the connector 220 and each of the shell assembly 210 and the pipe body 100 can be improved.

In the embodiment, as shown in FIG. 2, the connecting portion 225 of the bamboo joint structure is inserted into the pipe body 100 in interference fit, and the pipe body 100 is pressed on the connecting portion 225 through the locking sleeve 110. The locking sleeve 110 is made of a metal material, and deformed by squeezing to squeeze the pipe body 100, so as to fixedly connect the connector 220 with the pipe body 100. The lower end of the shell assembly 210 protrudes upwardly in an annular shape to form the annular stepped portion 213 and the connector channel 214, the connector 220 is rotatably inserted into the connector channel 214, and the first abutting portion 223 abuts against the upper end of the annular stepped portion 213, so that the filtering mechanism 200 can be connected with the external valve body conveniently, and the pipe body 100 can be avoided from being twisted easily during connection, resulting in deformation of the pipe body 100 to affect ventilation. In actual application, the connector 220 may also be in threaded connection or interference fit with the shell assembly 210, which may be set according to actual use needs specifically, and will not be limited herein.

In some embodiments, a second sealing ring 224 is arranged between an outer peripheral wall of the connector 220 and an inner peripheral wall of the connector channel 214. By arranging the second sealing ring 224 between the outer peripheral wall of the connector 220 and the inner peripheral wall of the connector channel 214, a gap between the outer peripheral wall of the connector and the inner peripheral wall of the connector channel can be sealed, so that sealing performance is improved, thus avoiding gas leakage and improving use safety.

In the embodiment, as shown in FIG. 2 and FIG. 6, the second sealing ring 224 is arranged on the outer peripheral wall of the connector 220 and two second sealing rings are provided. When the connector 220 is connected to the connector channel 214, the outer peripheral wall of the connector 220 and the inner peripheral wall of the connector channel 214 squeeze the second sealing ring 224, so as to seal the gap between the outer peripheral wall of the connector and the inner peripheral wall of the connector channel. In actual application, the shape, structure, quantity, and the like of the second sealing ring 224 may be set according to actual use needs, which will not be limited herein.

In some embodiments, a lower end of the pipe body 100 is provided with a connecting assembly 300 configured for being connected with an external valve body. By arranging the connecting assembly 300, the disclosure can be connected with other valve bodies conveniently, the disclosure can be mounted and used conveniently, and use convenience can be improved.

Figure 7:
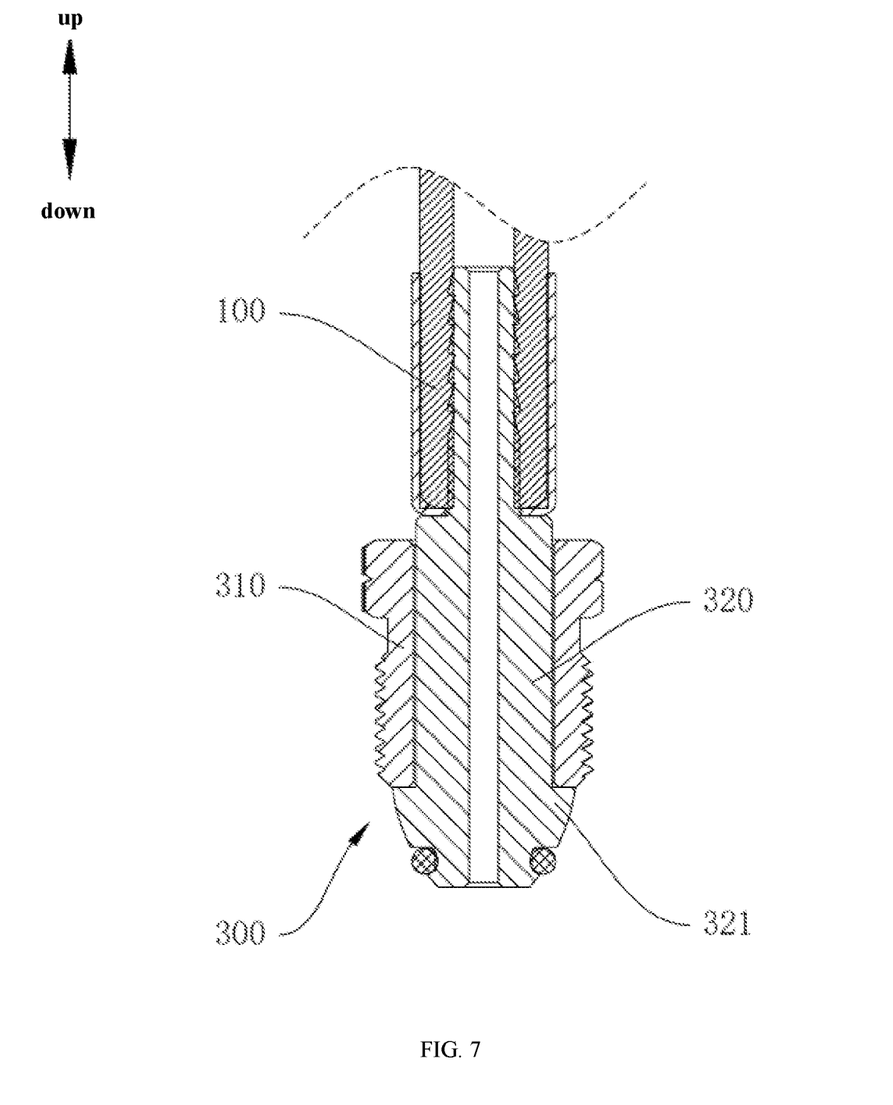
FIG. 7 is a another schematic structural diagram of a partial cross-section of the gas filtering rubber pipe in FIG. 1.
Figure 8:
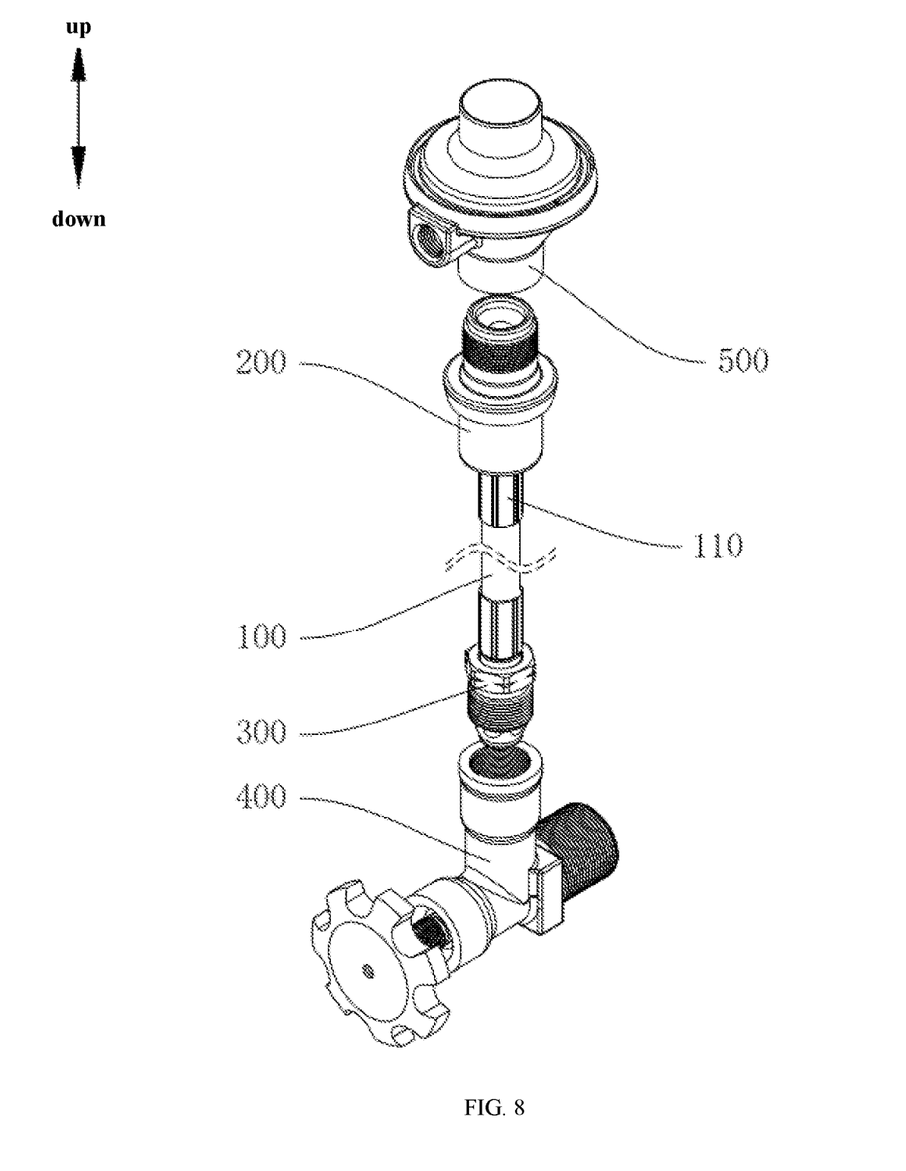
FIG. 8 is an exploded schematic structural diagram of a pressure regulating valve bank according to an embodiment of the disclosure.

In the embodiment, as shown in FIG. 1 and FIG. 7, the lower end of the pipe body 100 is provided with the connecting assembly 300. When the gas filtering rubber pipe is connected with the external valve body, the pipe body 100 is connected with a gas outlet end of the external valve body through the connecting assembly 300, so that gas is capable of entering the pipe body 100 from the lower end of the pipe body 100 for transportation. In actual application, a specific structure of the connecting assembly 300 may be set according to actual use needs, for example, it may be a threaded connection structure, a clamping structure or other locking structure, which will not be described in detail here, but will be described in detail below.

In some embodiments, the connecting assembly 300 includes a connecting handwheel 310 and a gas inlet connector 320. The gas inlet connector 320 is fixedly connected with the lower end of the pipe body 100, the connecting handwheel 310 is movably sleeved on the gas inlet connector 320, a lower end of the gas inlet connector 320 is provided with a second abutting portion 321 capable of abutting against a lower end of the connecting handwheel 310, and the connecting handwheel 310 is capable of being connected with the external valve body. By arranging the connecting handwheel 310 and the gas inlet connector 320, the connecting handwheel 310 is capable of being connected with the valve body, and the gas inlet connector 320 is pressed on a connecting end of the valve body through the second abutting portion 321, so that the disclosure can be connected with other valve bodies for use. The connecting handwheel and the gas inlet connector are simple in structure and convenient to connect and use.

In the embodiment, as shown in FIG. 1 and FIG. 7, the connecting handwheel 310 is provided with a thread configured for being connected with the external valve body, and the connecting handwheel 310 is capable of being screwed and connected with the gas outlet end of the external valve body through the thread. In actual application, the connecting handwheel 310 may also be a locking nut structure, and a specific structure of the connecting assembly 300 may also be changed according to actual use needs, which will not limited herein.

A pressure regulating valve bank according to an embodiment in a second aspect of the disclosure includes an angle valve 400, a pressure reducing valve 500 and the gas filtering rubber pipe according to the embodiment in the first aspect of the disclosure above. A gas outlet end of the angle valve 400 is connected with a gas inlet end of the gas filtering rubber pipe, and a gas inlet end of the pressure reducing valve 500 is connected with a gas outlet end of the gas filtering rubber pipe.

For the pressure regulating valve bank according to the embodiment of the disclosure, by using the gas filtering rubber pipe above, the gas is capable of being filtered when being outputted to the pressure reducing valve 500 from the gas filtering rubber pipe, so that durability and use safety of the pressure regulating valve bank can be improved, and a gas device matched with the pressure regulating valve bank can have a better combustion effect.

The angle valve 400, the pressure reducing valve 500 and other compositions in the pressure regulating valve bank according to the embodiment of the disclosure are all known to those of ordinary skills in the art, which will not be described in detail herein.

The embodiments of the disclosure are described in detail with reference to the accompanying drawings above, but the disclosure is not limited to the above embodiments, and various changes may also be made within the knowledge scope of those of ordinary skills in the art without departing from the purpose of the disclosure.

The invention claimed is:

1. A gas filtering rubber pipe, comprising:
   a pipe body having an upper end; and
   a filtering mechanism;
   said filtering mechanism including a shell assembly and a connector arranged at a lower end of said shell assembly;
   said shell assembly including a separation cavity and a gas outlet channel located in an upper portion of said shell assembly;
   said gas outlet channel communicating with said separation cavity;
   said connector having a lower end and an upper end;
   said lower end of said connector including a connecting portion configured for being fixedly connected with said upper end of said pipe body;
   said upper end of said connector including a filtering barrier;
   said connector having a gas outlet hole in a peripheral wall of said connector;
   said connector being connected with said filtering barrier;
   said filtering barrier being configured to block continuous upward transportation of gas through said connector;
   said filtering barrier being configured to redirect the upward transportation of gas to output transversely, with respect to the upward transportation of gas, from said connector through said gas outlet hole.

2. The gas filtering rubber pipe of claim 1, further comprising:
   a movable plug assembly provided in the gas outlet channel;
   said movable plug assembly configured to enable the gas outlet channel to be communicated with or disconnected from the separation cavity.

3. The gas filtering rubber pipe of claim 2, wherein said movable plug assembly includes a fixed plug body and a movable ejector pin, the fixed plug body is arranged in the gas outlet channel and provided with a plug body channel capable of communicating the gas outlet channel with the separation cavity, the movable ejector pin penetrates through the plug body channel and has a gap with a peripheral wall of the plug body channel, a lower end of the movable ejector pin is provided with a shielding portion capable of closing a gas inlet end of the plug body channel, and the movable ejector pin is capable of moving up and down.

4. The gas filtering rubber pipe of claim 3, wherein said movable ejector pin is sleeved with an elastic member, an upper end of the fixed plug body is provided with a clamping portion, the movable ejector pin is provided with a clamping boss capable of abutting against the clamping portion, the clamping boss is located between the elastic member and the clamping portion, and two ends of the elastic member respectively abut against a lower end of the fixed plug body and the clamping boss.

5. The gas filtering rubber pipe of claim 3, further comprising:
   a first sealing ring arranged between an outer peripheral wall of the fixed plug body and an inner peripheral wall of the gas outlet channel.

6. The gas filtering rubber pipe of claim 1, further comprising:

a lower end of the shell assembly provided with an annular stepped portion and a connector channel located in the annular stepped portion, the connector penetrates through the annular stepped portion via the connector channel, the upper end of the connector is provided with a first abutting portion abutting against an upper end of the annular stepped portion, the pipe body is provided with a locking sleeve, and the upper end of the pipe body is fixedly connected with the connecting portion through the locking sleeve.

7. The gas filtering rubber pipe of claim 6, further comprising:
a second sealing ring arranged between an outer peripheral wall of the connector and an inner peripheral wall of the connector channel.

8. The gas filtering rubber pipe of claim 1, further comprising:
a lower end of the pipe body provided with a connecting assembly configured for being connected with an external valve body.

9. The gas filtering rubber pipe of claim 8, wherein said connecting assembly includes a connecting handwheel and a gas inlet connector, the gas inlet connector is fixedly connected with the lower end of the pipe body, the connecting handwheel is movably sleeved on the gas inlet connector, a lower end of the gas inlet connector is provided with a second abutting portion capable of abutting against a lower end of the connecting handwheel, and the connecting handwheel is capable of being connected with the external valve body.

10. A pressure regulating valve bank, comprising:
an angle valve;
a pressure reducing valve; and
a gas filtering rubber pipe having a gas inlet end and a gas outlet end;
said gas filtering rubber pipe including a pipe body having an upper end and a filtering mechanism;
said filtering mechanism including a shell assembly and a connector arranged at a lower end of said shell assembly;
said shell assembly including a separation cavity and a gas outlet channel located in an upper portion of said shell assembly;
said gas outlet channel communicating with said separation cavity;
said connector having a lower end and an upper end;
said lower end of said connector including a connecting portion configured for being fixedly connected with said upper end of said pipe body;
said upper end of said connector including a filtering barrier;
said connector having a gas outlet hole in a peripheral wall of said connector;
said connector being connected with said filtering barrier;
said angle valve having a gas outlet end, said gas outlet end of said angle valve being connected with said gas inlet end of said gas filtering rubber pipe;
said pressure reducing valve having a gas inlet end, said gas inlet end of said pressure reducing valve being connected with said gas outlet end of said gas filtering rubber pipe;
said filtering barrier being configured to block continuous upward transportation of gas through said connector;
said filtering barrier being configured to redirect the upward transportation of gas to output transversely, with respect to the upward transportation of gas, from said connector through said gas outlet hole.

11. The pressure regulating valve bank of claim 10, further comprising:
a movable plug assembly provided in the gas outlet channel, and the movable plug assembly enables the gas outlet channel to be communicated with or disconnected from the separation cavity.

12. The pressure regulating valve bank of claim 11, wherein said movable plug assembly includes a fixed plug body and a movable ejector pin, the fixed plug body is arranged in the gas outlet channel and provided with a plug body channel capable of communicating the gas outlet channel with the separation cavity, the movable ejector pin penetrates through the plug body channel and has a gap with a peripheral wall of the plug body channel, a lower end of the movable ejector pin is provided with a shielding portion capable of closing a gas inlet end of the plug body channel, and the movable ejector pin is capable of moving up and down.

13. The pressure regulating valve bank of claim 12, wherein said movable ejector pin is sleeved with an elastic member, an upper end of the fixed plug body is provided with a clamping portion, the movable ejector pin is provided with a clamping boss capable of abutting against the clamping portion, the clamping boss is located between the elastic member and the clamping portion, and two ends of the elastic member respectively abut against a lower end of the fixed plug body and the clamping boss.

14. The pressure regulating valve bank of claim 12, further comprising:
a first sealing ring is arranged between an outer peripheral wall of the fixed plug body and an inner peripheral wall of the gas outlet channel.

15. The pressure regulating valve bank of claim 10, further comprising:
a lower end of the shell assembly is provided with an annular stepped portion and a connector channel located in the annular stepped portion, the connector penetrates through the annular stepped portion via the connector channel, the upper end of the connector is provided with a first abutting portion abutting against an upper end of the annular stepped portion, the pipe body is provided with a locking sleeve, and the upper end of the pipe body is fixedly connected with the connecting portion through the locking sleeve.

16. The pressure regulating valve bank of claim 15, further comprising:
a second sealing ring is arranged between an outer peripheral wall of the connector and an inner peripheral wall of the connector channel.

17. The pressure regulating valve bank of claim 10, further comprising:
a lower end of the pipe body is provided with a connecting assembly configured for being connected with an external valve body.

18. The pressure regulating valve bank of claim 17, wherein said connecting assembly includes a connecting handwheel and a gas inlet connector, the gas inlet connector is fixedly connected with the lower end of the pipe body, the connecting handwheel is movably sleeved on the gas inlet connector, a lower end of the gas inlet connector is provided with a second abutting portion capable of abutting against a lower end of the connecting handwheel, and the connecting handwheel is capable of being connected with the external valve body.

* * * * *